United States Patent [19]
Takakura et al.

[11] Patent Number: 5,509,113
[45] Date of Patent: Apr. 16, 1996

[54] IMAGE PRODUCING APPARATUS

[75] Inventors: Masaki Takakura, Osaka; Masaki Kobayashi, Yamato-Koriyama; Yasukuni Yamane, Shiki; Noritoshi Kako, Nara, all of Japan

[73] Assignee: Sharp Kabushiki Kaisha, Osaka, Japan

[21] Appl. No.: 233,263

[22] Filed: Apr. 26, 1994

[30] Foreign Application Priority Data

Apr. 27, 1993 [JP] Japan .................... 5-101399

[51] Int. Cl.⁶ .................................... G06F 15/62
[52] U.S. Cl. .................................... 395/142
[58] Field of Search .................... 395/140, 141, 395/142, 133; 345/118, 113, 114, 115

[56] References Cited

U.S. PATENT DOCUMENTS

| | | | |
|---|---|---|---|
| 4,849,910 | 7/1989 | Jacobs et al. | 364/914 |
| 4,905,166 | 2/1990 | Schuerman | 364/518 |
| 5,115,494 | 5/1992 | Seki | 395/127 |
| 5,208,904 | 5/1993 | Sasaki | 395/143 |
| 5,307,453 | 4/1994 | Takashino | 395/133 |
| 5,325,476 | 6/1994 | Takii et al. | 395/141 |
| 5,377,314 | 12/1994 | Bates et al. | 395/135 |

FOREIGN PATENT DOCUMENTS

63-243986  10/1988  Japan.

*Primary Examiner*—Phu K. Nguyen

[57] ABSTRACT

An apparatus for producing a railroad symbol and a road symbol, includes a CPU, a coordinates input device, an external storage device and a display. The CPU has an operation unit for performing a drawing operation, an interface circuit and a memory for storing data and a program. The railroad symbol is produced by continuous drawing of figure parts. The road symbol is produced by overlapping curved line drawn with a circle in a color and curved line drawn with smaller circle in another color.

11 Claims, 11 Drawing Sheets

IMAGE PRODUCING APPARATUS

BACKGROUND OF THE INVENTION

1. Field of the Invention

The present invention relates to an image producing apparatus for producing images of road, railroad and other map symbols by using a coordinates input device provided with a pen or a mouse.

2. Description of the Related Art

Figure 9:
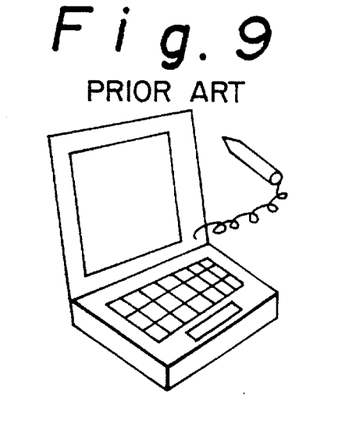
FIG. 9 is a schematic illustration showing a concept of a wordprocessor with a coordinates input device.
Figure 10:
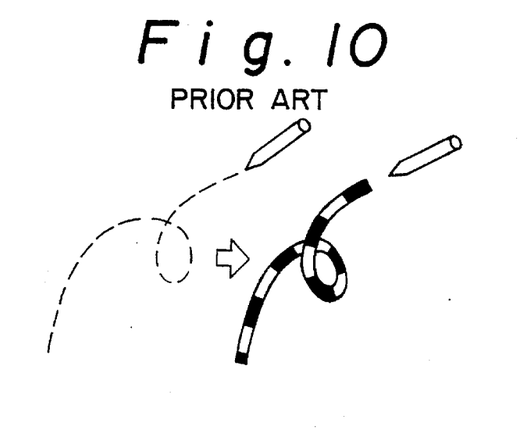
FIG. 10 is a schematic illustration showing an image of inputting of free curved line.

In these days, wordprocessors are generally used for writing a document. Some documents written by a wordprocessor include not only a letter but an image. There are some wordprocessors which have a coordinates input device provided with a graphical user interface such as a tablet, a digitizer and a mouse. FIG. 9 shows a concept of a wordprocessor with a coordinates input device. It is ordinary to use a pen or a mouse in order to input an image to a document by the wordprocessor, as shown in FIG. 9.

Figure 11:
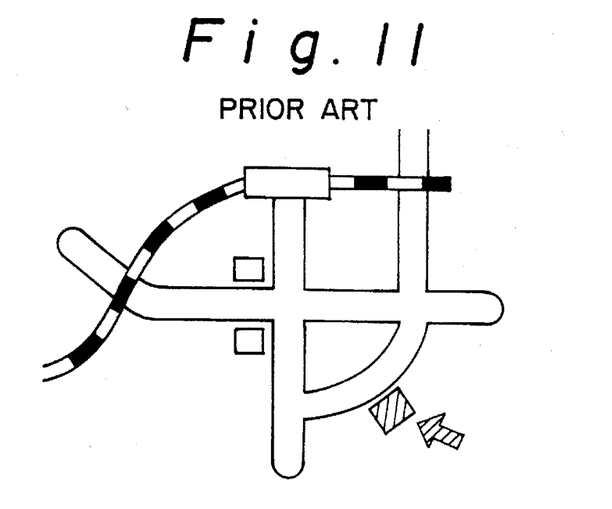
FIG. 11 is a schematic illustration showing an example of a map.

A map is often drawn up by a wordprocessor, because a map is very useful for pointing out a location. Roads, buildings, railroads and other map symbols are often drawn in the map as a mark. Special software for image drawing is generally used for producing the above mentioned map. FIG. 11 shows an example of the map.

In such a wordprocessor with a coordinates input device shown in FIG. 9, it is convenient and useful that a road symbol or a railroad symbol is generated in accordance with a free curved line inputted by the coordinates input device as shown in FIG. 9. However, many conventional software of image drawing have limitations that the forms of roads and railroads must be straight or predetermined arc, because of their difficulties in drawing freehand curved lines with accuracy.

Figure 12A:
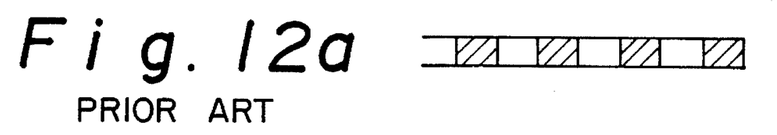
FIG. 12a shows a drawn pattern.
Figure 13A:
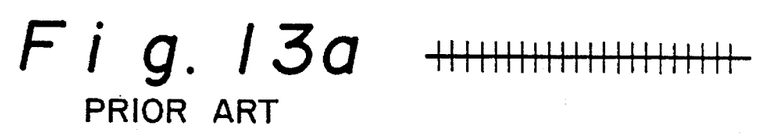
FIG. 13a shows a drawn pattern.

Symbols shown in FIG. 12a and FIG. 13a are generally used as a representation of a railroad in a map. In this specification, the symbol shown in FIG. 12a is called "white and black pattern railroad" and the symbol shown in FIG. 13a is called "+ pattern railroad".

The conventional way of producing "white and black pattern railroad" by using a wordprocessor or a personal computer is as follows.

Figure 12B:
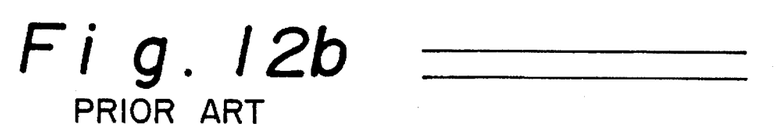
FIG. 12b shows a first step of the method and FIG. 12c shows a second step of the method.
Figure 12C:
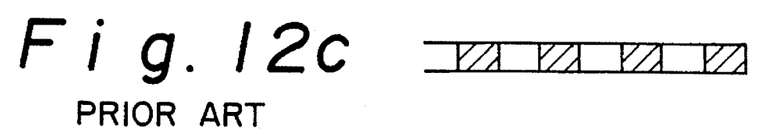

1. Draw two parallel line as shown in FIG. 12b.
2. Paint black zones in same space as shown in FIG. 12c.

The conventional way of producing "+ pattern railroad" by using a wordprocessor or a personal computer is as follows.

Figure 13B:
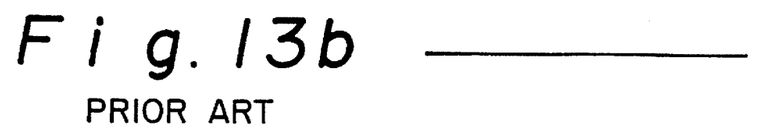
FIG. 13b shows a first step of the method and FIG. 13c shows a second step of the method.
Figure 13C:
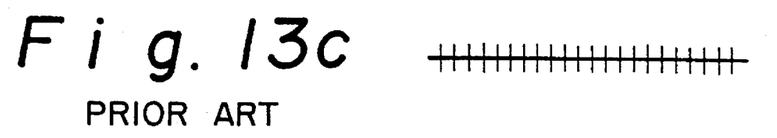

1. Draw a straight line as shown in FIG. 13b.
2. Draw short lines to cross the straight line at a right-angle as shown in FIG. 13c.

The symbol composed of straight lines, curved lines and arcs is used generally as a representation of a road in a map. In this specification, this symbol is called "round edge road". The conventional way of producing "round edge road" by using a wordprocessor or a personal computer is drawing each of straight lines, curved lines and arcs one by one.

For the conventional way of drawing a railroad, it is easy to draw straight railroad symbols. However, there are some problems in a case where drawing railroad symbols includes free curve.

For producing "white and black pattern railroad", there are some problems as follows.

1. In a method of producing each two straight lines, it is difficult to draw two parallel lines with accuracy.

Figure 14A:
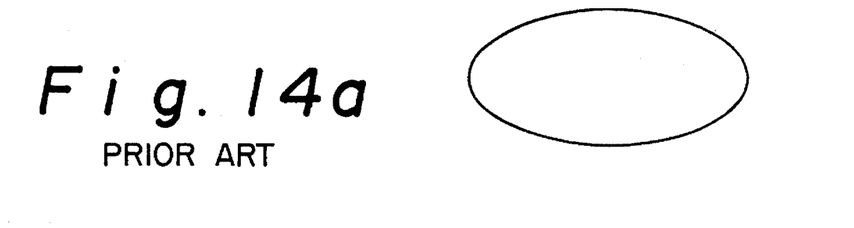
FIG. 14a shows a curved line and 14b shows a result of a parallel moving.
Figure 14B:
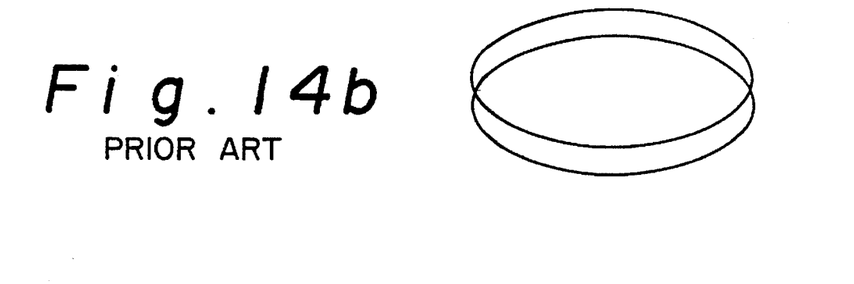

2. In a method of producing two parallel lines by moving one line in parallel, the curved line as shown in FIG. 14b is produced by parallel movement of the curved line as shown in FIG. 14a.

Figure 15:
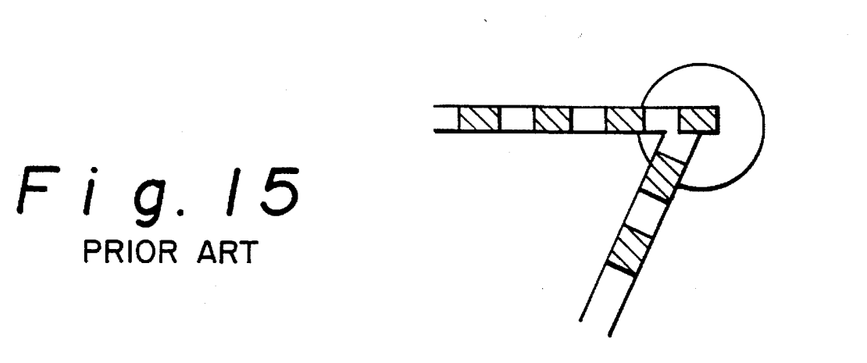
FIG. 15 is an explanation view showing a difficult example for the conventional method of drawing the "white and black pattern railroad"

3. Lines between white zones and black zones should be drawn at a right-angle to a direction of the "white and black pattern railroad". It is preferable to produce the lines automatically between white zones and black zones and to paint the black zones automatically. However, it is not easy to determine the direction of the line between white zone and black zone at curving portion in a case like FIG. 15.

For producing "+ pattern railroad", it is very troublesome to draw many perpendicular short lines across the drawn center line. It is difficult to determine the direction of the perpendicular short lines at curving portion like such a case of "white and black pattern railroad".

Figure 16:
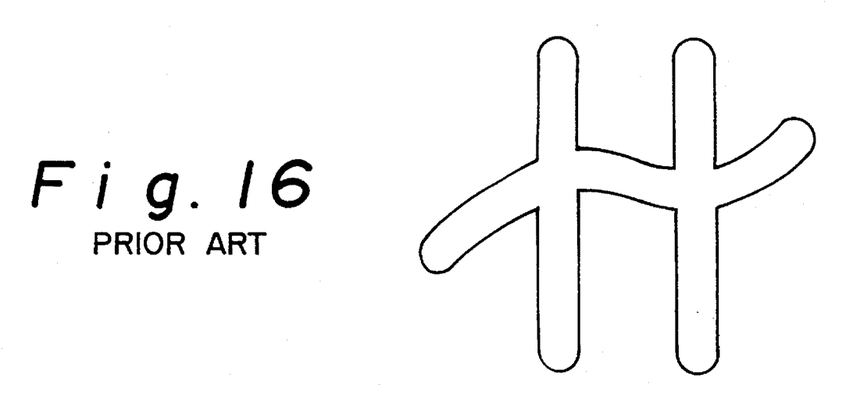
FIG. 16 is an explanation view showing an example for the conventional method of drawing the "round edge road".

In a conventional method of producing road symbols, it is necessary to draw many straight lines, curved lines and arcs. For example, the road symbols shown in FIG. 16 is composed of eight straight lines, six curve lines and six arcs.

A pair of strait lines must be parallel to each other with accuracy. A pair of curved lines must be parallel to each other with accuracy. In a case where producing straight road symbols, it is possible to produce by parallel movement same as above mentioned case of producing railroad symbols. However, it is difficult to produce curved road symbols as shown in FIG. 14a in the same way.

SUMMARY OF THE INVENTION

It is an object of the present invention to provide an image producing apparatus for producing free curved railroad symbols freely and easily.

It is another object of the present invention to provide an image producing apparatus for producing free curved road symbols freely and easily.

The object of the present invention can be achieved by an image producing apparatus comprising:

a coordinates input means;

an image storing means for storing a figure parts constructing a predetermined image with a curved line; and a drawing means for drawing said image by reading out said stored figure parts and drawing said stored figure parts repeatedly along a coordinates inputted through said coordinates input means.

It is desirable for the apparatus to provide a coordinates storing means for storing coordinates of a temporary end of said drawn image in series; and a determining means for determining a direction of said drawn image from said stored coordinates in said coordinates storing means and inputted coordinates.

Further, it is also desirable for the apparatus to provide a prohibiting means for prohibiting said figure parts from being drawn in a situation where a distance between said stored coordinates in said coordinates storing means and said inputted coordinates is narrower than a width of said figure parts.

The another object of the present invention can be achieved by an image producing apparatus comprising:

a first drawing means for drawing first curved lines having a width corresponding to a first figure parts;

a second drawing means for drawing second curved lines on said curved lines drawn by said first drawing means, said second drawing means having a width corresponding to a second figure parts; and a producing means for producing curved lines including two parallel lines, each line of said two parallel lines having a half width of a difference between said width of said first curved lines and said width of said second curved lines.

It is desirable for the apparatus to provide a coordinates storing means for storing coordinates of said curved lines produced by said producing means and an erasing means for erasing a portion of said curved lines appointed by said second drawing means, said appointed portion belonging to one of crossing sections of curved lines produced by said producing means.

In an embodiment of the image producing apparatus comprising above mentioned construction, coordinates of a point to input a railroad symbol is inputted through the coordinates input means in turn. Free curved railroad symbols are generated by drawing the figure parts stored in the image storing means, repeatedly by the drawing means, in accordance with said inputted points.

The coordinates storing means stores the coordinates of a temporary end of the drawn image in series. The determining means determines a direction of the drawn image from the stored coordinates in the coordinates storing means and an inputted coordinates. The prohibiting means prohibits the figure parts from drawing, in a case where a distance between the latest stored coordinates in the coordinates storing means and the inputted coordinates is narrower than the width of the figure parts.

In another embodiment of the image producing apparatus comprising above mentioned construction, coordinates of a point to input a road symbol is inputted through the coordinates input means in turn.

The first drawing means draws a first line by connecting the inputted coordinates with a width of predetermined first figure parts, and paints the first line in a predetermined color. The second drawing means draws a second line in accordance with data read out from the coordinates storing means to overlap the line on the first line with a width of predetermined second figure parts, and paints the second line in another color, said second figure parts having a width narrower than the width of the first figure parts. A road symbol is generated with a half width corresponding to a difference of the width of the first line and the width of the second line in this manner.

In a case of erasing a crossing portion of the drawn road symbols, the erasing means erases the crossing portion by using the second figure parts in accordance with the data read out from the coordinates storing means.

The image producing apparatus of the present invention provides advantages as follows.

1. Free curved railroad symbols and road symbols are drawn very easily, because their inputs are made directly through a coordinates input means such as a pen or a mouse.
2. In a case of drawing railroad symbols, "white and black pattern" or "+ pattern railroad" is generated automatically in a pertinent direction in accordance with a judgment from the stored coordinates points.
3. In a case of drawing road symbol, cubic crossed road symbol is easily generated by drawing a continuous line by drawing a first line with a first color and a second line with a second color at the same time. In a case of erasing a cubic crossed portion, the cubic crossed portion is erased by drawing the second line with the second color in accordance with the stored coordinates in the coordinates storing means.

Further objects and advantages of the present invention will be apparent from the following description of the preferred embodiments of the invention as illustrated in the accompanying drawings.

BRIEF DESCRIPTION OF THE DRAWINGS

FIG. 3a to 3d are explanation views showing a method of drawing the "white and black pattern railroad", in which

FIG. 5a to 5c are explanation views showing a method of drawing the "+ pattern railroad", in which

FIG. 7a to 7d are explanation views showing a method of drawing the "round edge road", in which

FIG. 12a to 12c are explanation views showing the conventional method for drawing the "white and black pattern railroad", in which

FIG. 13a to 13c are explanation views showing the conventional method for drawing the "+ pattern railroad", in which

FIG. 14a and 14b are explanation views showing a difficult example for the conventional method, in which

DESCRIPTION OF THE PREFERRED EMBODIMENTS

The embodiments of an image producing apparatus according to the present invention will be described in detail with reference to the accompanying drawings.

The coordinates input device in each of the following embodiments includes a switch for judging an end of the input of coordinates. A pen having the switch at its tip and a mouse having a button are the examples of the coordinates input device.

Figure 8:
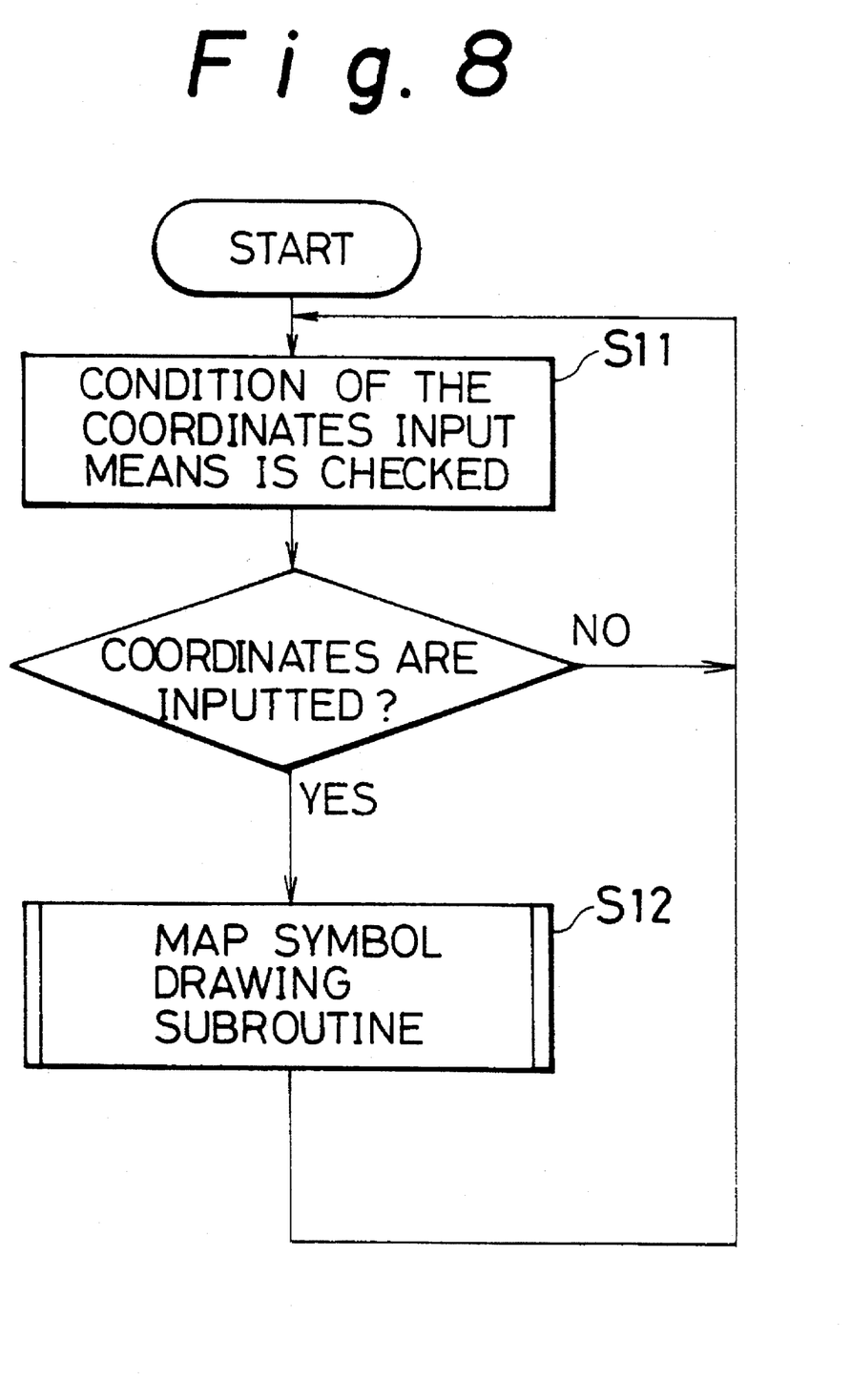
FIG. 8 is a flow chart showing the steps of inputting a map symbol.

FIG. 8 shows an outline flow chart of the following embodiments. The image producing apparatus as shown in FIG. 8 includes a coordinates input device such as a tablet, a digitizer and a mouse.

In the step S11, a condition of the coordinates input device is checked though a switch on it. In a case where the switch is on, the flow goes to the step S12 to execute the drawing of railroad symbols or road symbols as follows.

After the drawing has finished, the flow returns to the step S11. In a generally graphical user interface program, it has an ordinary step to check the end of the drawing by a cursor or a menu. This step is omitted in the following embodiments for the sake of brevity.

Figure 1:
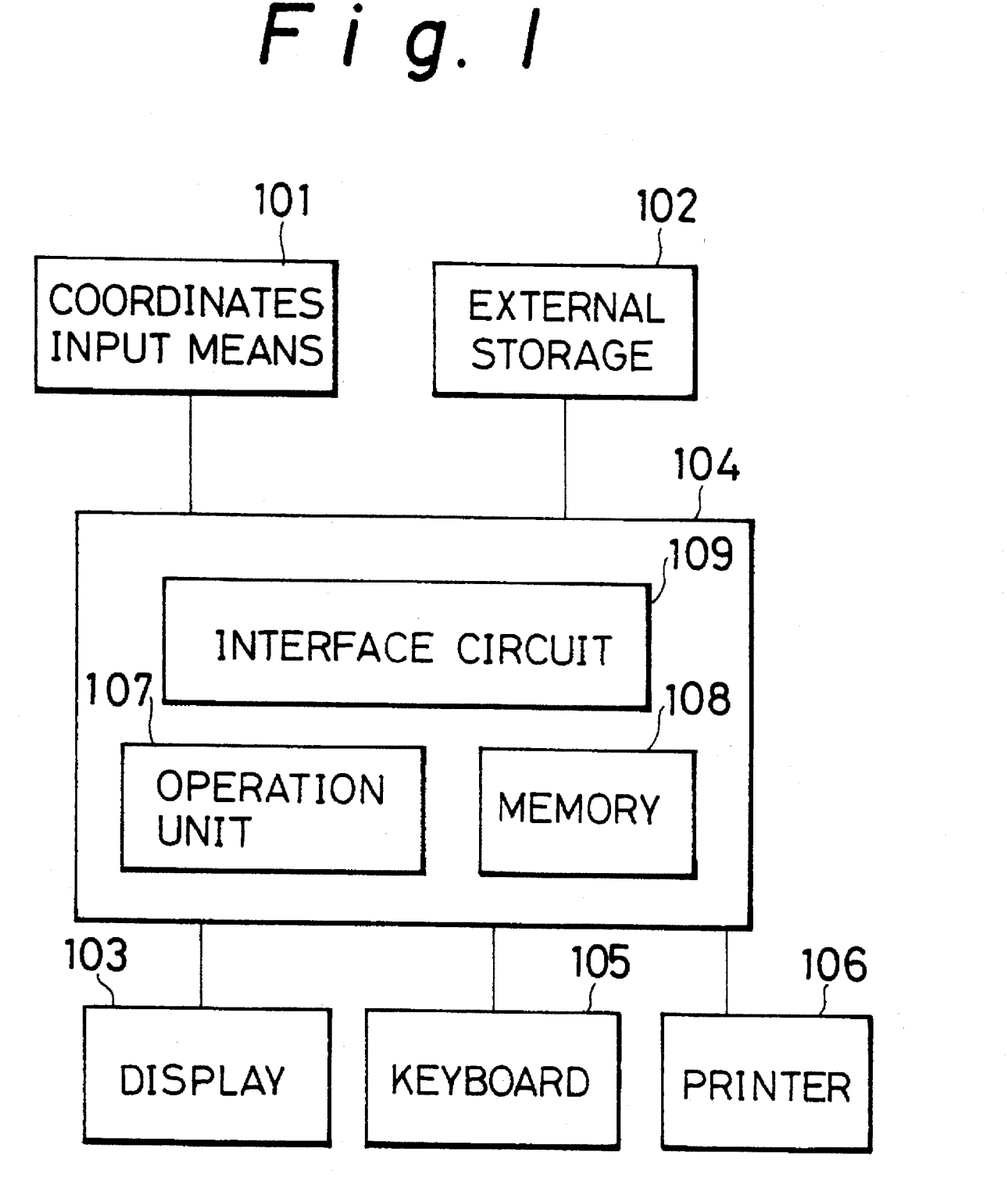
FIG. 1 is a block diagram showing a first embodiment of an image producing apparatus according to the present invention.

FIG. 1 is a block diagram showing the embodiment of an image producing apparatus according to the present invention. The image producing apparatus in FIG. 1 includes a coordinates input device 101 for inputting the coordinates data to draw the symbols, an external storage 102 for storing the data such as a floppy disc or a hard disc, a display 103 for displaying the data on a screen and a central processing unit (CPU) 104 for executing the drawing. Further, the apparatus may provide a keyboard 105 for inputting the data or a command, and a printer 106 for outputting the processed data.

The central processing unit (CPU) 104 includes an operation unit 107 for operating the drawing process, a memory 108 for storing the data for drawing process such as the program and the figure parts and an interface circuit 109 for connecting to the external devices. The following temporary storage memory Q is included in the memory 108.

Railroad symbols and road symbols are produced in accordance with the data inputted though the coordinates input device 101. Each structure of the following embodiments is same as FIG. 1. The following embodiments are different only in the flow chart. The flow chart is stored in a form of a program in the memory 108. CPU 104 reads out and performs the program.

The first embodiment of an image producing apparatus for drawing the railroad symbol according to the present invention will be described with reference to FIG. 2, and FIG. 3a to 3d.

Figure 2:
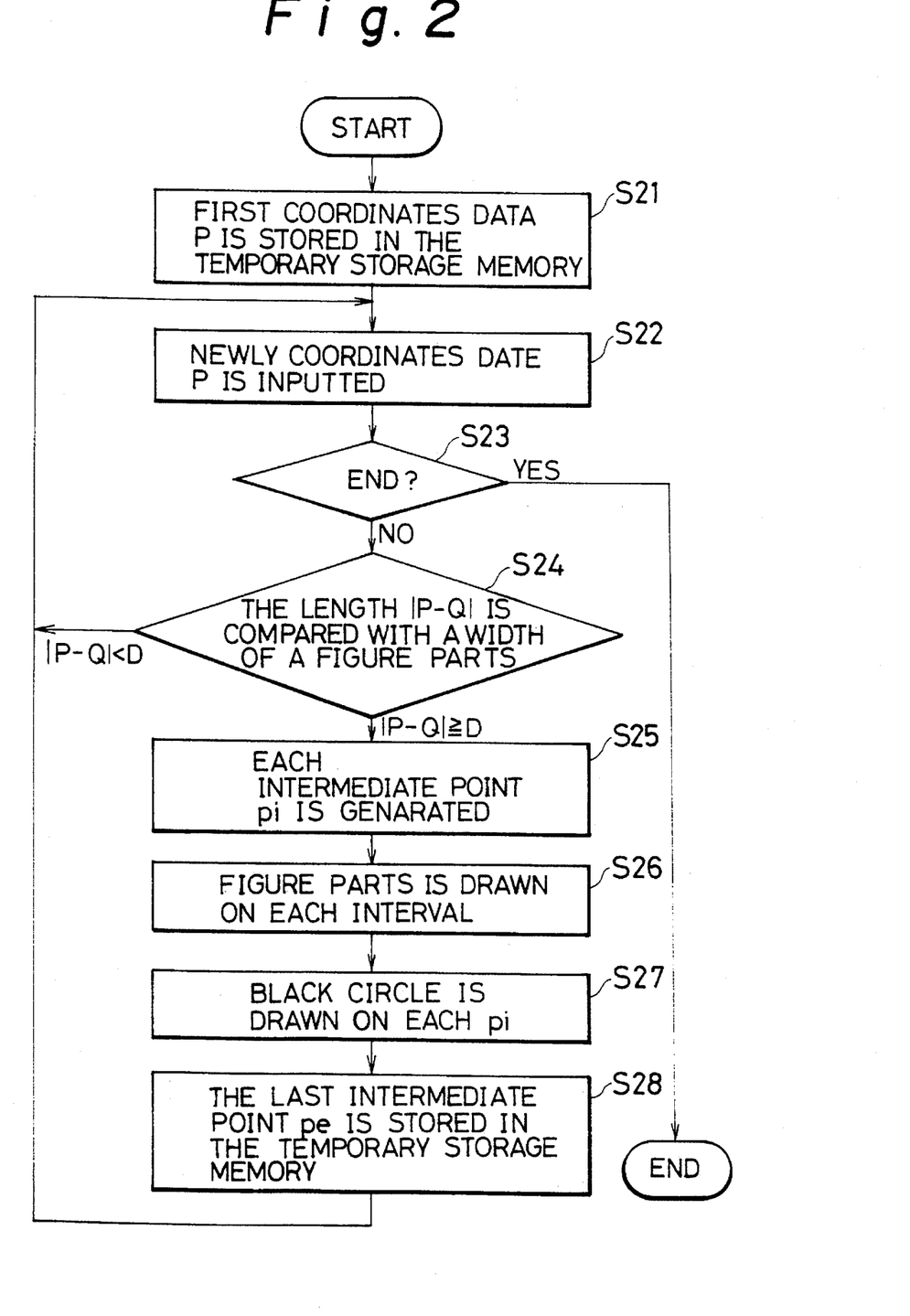
FIG. 2 is a flow chart showing the steps of drawing the "white and black pattern railroad"

The flow chart of "white and black pattern railroad" drawing procedure in the image producing apparatus is shown in FIG. 2. The drawing procedure is as follows.

In the step S21, the coordinates of first point P inputted through the coordinates input device 101 is stored in the temporary storage memory Q. After that, the coordinates data stored in the temporary storage memory Q is called coordinates data Q, and the point displayed by the coordinates data Q is called point Q.

In the step S22, a new coordinates data P is inputted though the coordinates input device 101. After that, the newly inputted coordinates data is called coordinates data P, and the point displayed by the newly inputted data is called point P.

In the step S23, CPU 104 judges whether the input of coordinates through the coordinates input device 101 is over or not. In a case where the input of coordinates is over, the flow finishes the drawing program. In a case where the input of coordinates is not over, the flow goes to the step S24. The judgment of whether the input of coordinates is over or not, is based on the condition of at least one switch disposed on the coordinates input device 101. That is, in a case where the switch is on, CPU 104 understands the input of coordinates is still continuing, and in a case where the switch is off, CPU 104 understands the input of coordinates is over.

In the step S24, CPU 104 calculates |P−Q| which refers to a distance between the coordinates data P inputted in the step S22 and the coordinates data Q stored in the temporary storage memory Q in the step S21. Then, CPU 104 compares |P−Q| with a predetermined data D expressing a width of the figure parts of "white and black pattern railroad" shown in FIG. 3A.

In a case where |P−Q| is less than D, the flow returns to the step S22.

In a case where |P−Q| is not less than D, the flow goes to the step S25.

In the step S25, a temporary (straight) line is drawn from the point Q to the point P, and intermediate point pi is generated at every distance D from the point Q. For example, the coordinates point P is inputted at a distance of two times of D or more from the point Q, two or more intermediate points pi are generated. In this case, the following expression exists.

$$0 < i \leq |P-Q|/D$$

Figure 3A:
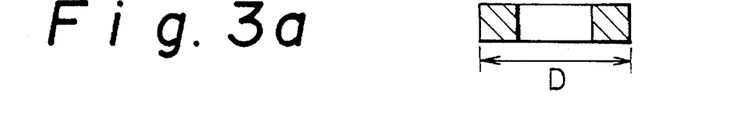
FIG. 3a shows a figure parts of the pattern.
Figure 3B:
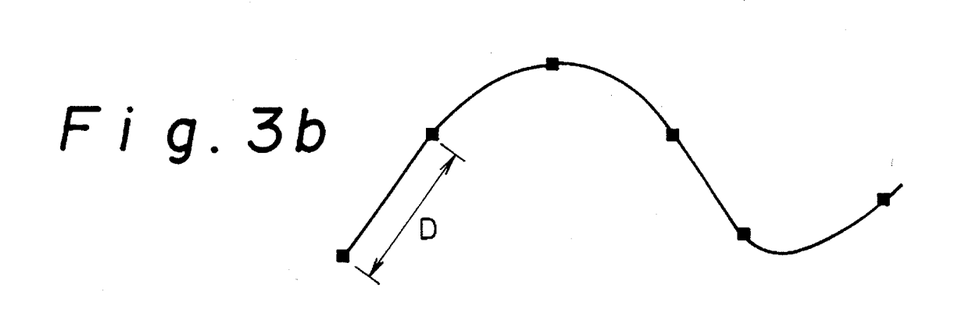
FIG. 3b shows an input image though the coordinates input device.

FIG. 3b shows an example of intermediate points pi generated in this manner. The curved line in FIG. 3b shows a temporary line corresponding to the coordinates points inputted through the coordinates input device 101. Every intermediate point pi is generated, in a case where the distance between the point P and the point Q is not less than D.

Figure 3C:
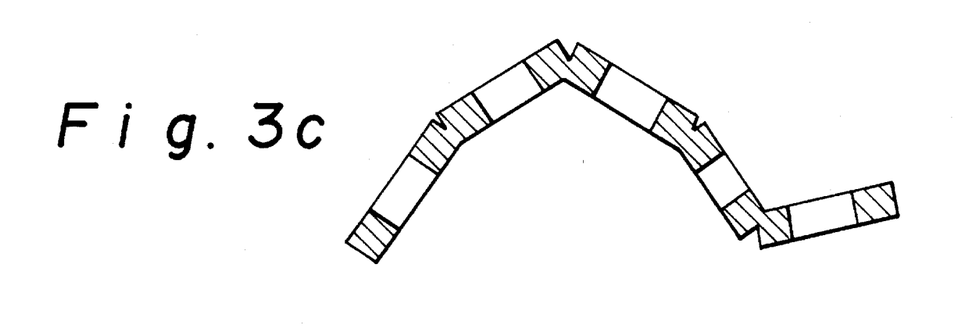
FIG. 3c shows an input image of a figure parts and FIG. 3d shows a produced image of the "white and black pattern railroad"

In the step S26, the figure part of "white and black pattern railroad" shown in FIG. 3a is drawn on every interval of the point P, intermediate point pi and the point Q. The figure part is a pattern with a white square between two black squares, for example. "White and black pattern" is constructed by continuous drawing of the figure parts shown in FIG. 3a. The figure part as shown in FIG. 3a is prestored in the memory 108. CPU 104 reads out the figure parts from the memory 108 and draws in the same direction to the line segment connecting coordinates point before and behind. It is easy to decide the drawing direction of the figure parts, because the coordinates points of both ends of the figure parts are defined. FIG. 3C shows a result of this manner.

Figure 3D:
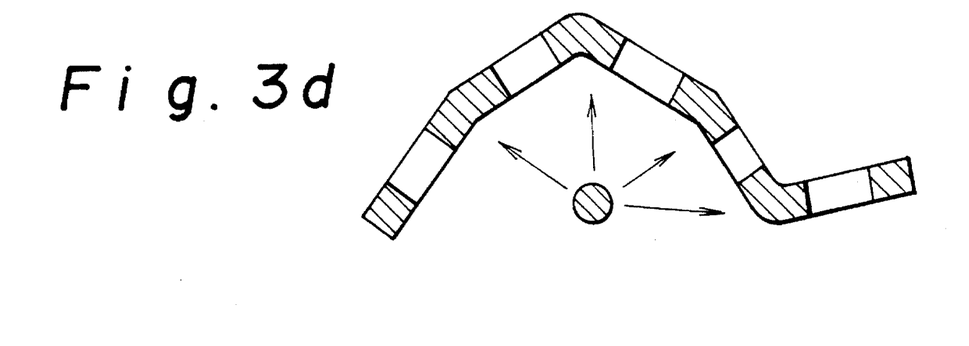

In the step S27, a black circle is drawn automatically on every connective point of the figure parts (intermediate point pi). The diameter of the black circle is identical in a diameter with the width of "white and black pattern railroad". FIG. 3d shows a result of this manner.

In the step S28, the last intermediate point pe is stored in the temporary storage memory Q, the pe is generated in the step S25.

In the step S25, the temporary line may be drawn from the point Q to the point P by well known curve interpolation method using the inputted coordinates and after that, intermediate point pi may be generated.

In this embodiment, no figure parts of railroad symbol are generated until a point is inputted at a distance more than the width of the railroad symbol from the point of the last railroad symbol stored in the temporary storage memory Q. For that reason, no sharp curve is generated in the railroad symbols.

In the step S23, the drawing will be finished without special treatment. In this case, it is possible to generate railroad symbol in accordance with previously inputted coordinates data read out from the temporary storage memory Q.

The second embodiment of image producing apparatus for drawing the railroad symbol according to the present invention will be described with reference to FIG. 4 and FIG. 5a to 5c.

Figure 4:
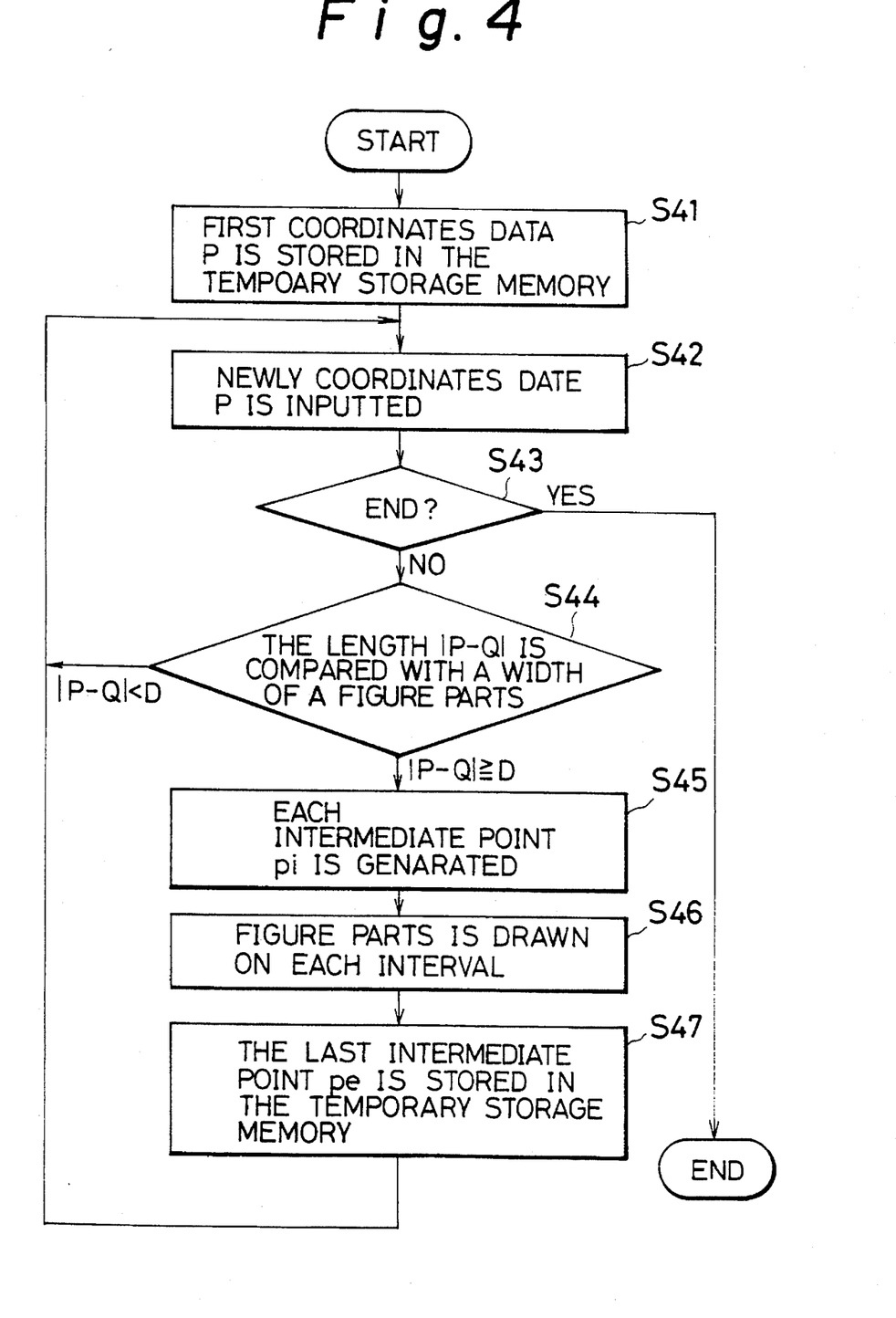
FIG. 4 is a flow chart showing the steps of drawing the "+ pattern railroad"

The flow chart of "+ pattern railroad" drawing in the image producing apparatus is shown in FIG. 4. The drawing procedure is as follows.

In the step S41, the coordinates of first point P inputted through the coordinates input device 101 is stored in the temporary storage memory Q.

In the step S42, a new coordinates P is inputted though the coordinates input device 101.

In the step S43, CPU 104 judges whether the input of coordinates through the coordinates input device 101 is over or not. In a case where the input of coordinates is over, the flow goes to the end. In a case where the input of coordinates is not over, the flow goes to the step S44.

In the step S44, CPU 104 calculates |P−Q| which refers to a distance between the coordinates data P inputted in the step S22 and the coordinates data Q stored in the temporary storage memory Q in the step S21. Then, CPU 104 compares |P−Q| with a predetermined data D expressing a width of the figure parts of "+ pattern railroad" shown in FIG. 5a.

In a case where |P−Q| is less than D, the flow returns to the step S42.

In a case where |P−Q| is not less than D, the flow goes to the step S45.

In the step S45, a temporary (straight) line is drawn from the point Q to the point P, and intermediate point pi is generated at every distance D from the point Q. For example, the coordinates point P is inputted at a distance of two times of D or more from the point Q, two or more intermediate points pi are generated. In this case, a following expression exists.

$$0 < i \leq |P-Q|/D$$

Figure 5A:
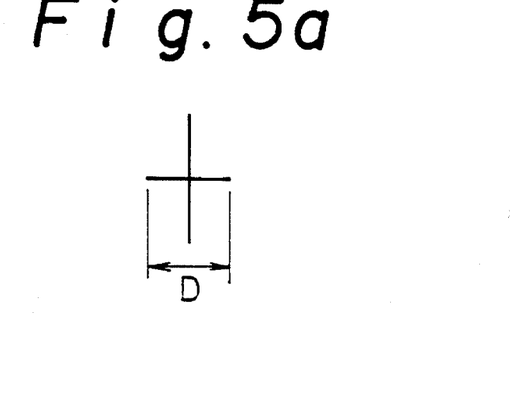
FIG. 5a shows a figure parts of the pattern.
Figure 5B:
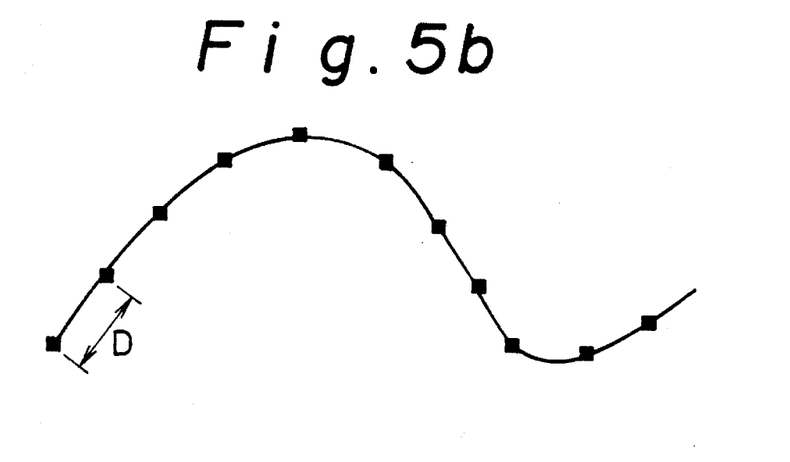
FIG. 5b shows an input image though the coordinates input device and FIG. 5c shows a produced image of the pattern.

FIG. 5b shows an example of intermediate points pi generated in this manner. The curved line in FIG. 5b shows a temporary line corresponding to the coordinates points inputted through the coordinates input device 101. Every intermediate point pi is generated, in a case where the distance between the point P and the point Q is not less than D.

Figure 5C:
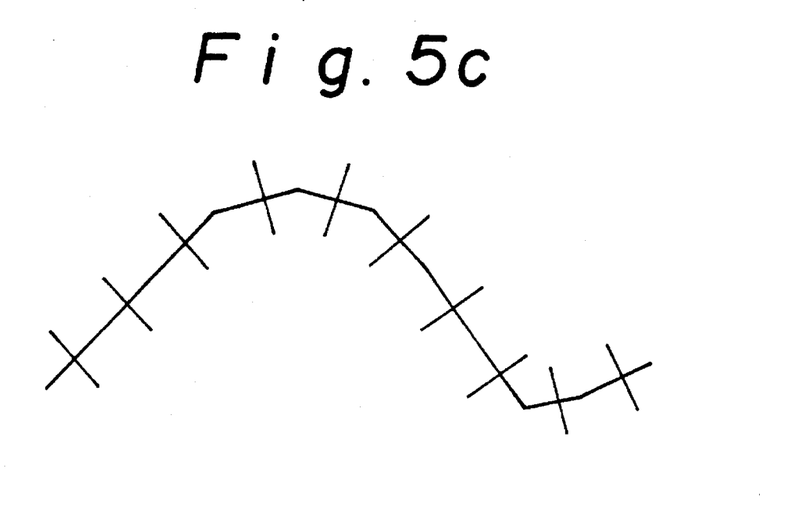

In the step S46, the figure parts of "+ pattern railroad" shown in FIG. 5a is drawn on every interval of the point P, intermediate point pi and the point Q. The figure part shown in FIG. 5a is prestored in the memory 108. CPU 104 reads out the figure parts from the memory 108 and draws in a same direction to the line segment connecting coordinates point before and behind. It is easy to decide the drawing direction of the figure parts, because the coordinates points of both ends of the figure parts are defined. FIG. 5c shows a result of this manner.

In the step S47, the last intermediate point pe is stored in the temporary storage memory Q, and the pe is generated in the step S45. Then, flow returns to the step S42.

In the step S45, the temporary line may be drawn from the point Q to the point P by well known curve interpolation method using the inputted coordinates and after that, intermediate point pi may be generated.

In this embodiment, no figure part of the railroad symbol is generated until the point is inputted at a distance more than the width of the railroad symbol from the point of the last railroad symbol stored in the temporary storage memory Q. For that reason, no sharp curve is generated in the railroad symbols.

In the step S43, the flow goes to the end without special treatment. In this case, it is possible to generate railroad symbol in accordance with previously inputted coordinates data read out from the temporary storage memory Q.

Another embodiment of image producing apparatus for drawing the road symbol according to the present invention will be described with reference to FIG. 6 and FIG. 7a to 7d. The following coordinates storage memory Q is included in the memory 108.

Figure 6:
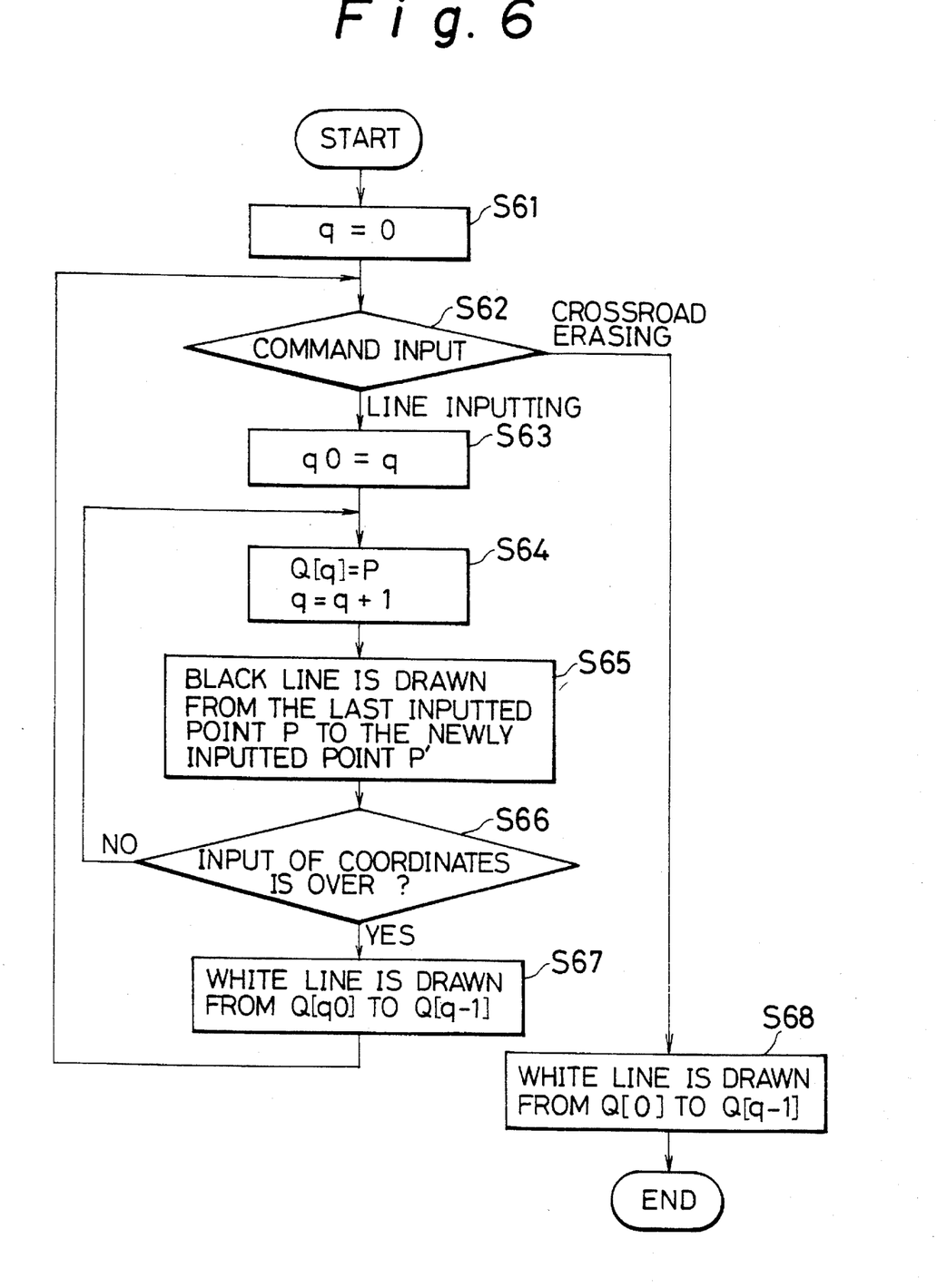
FIG. 6 is a flow chart showing the steps of drawing the "round edge road"

The flow chart of "round edge road" drawing in the image producing apparatus is shown in FIG. 6. The drawing procedure is as follows.

In the step S61, a write pointer q in the coordinates storage memory is initialized.

In the step S62, one of the commands is inputted. The apparatus has three commands, "line inputting", "crossroad erasing" and "finish". In a case where "crossroad erasing" is inputted, the flow goes to the step S68. In a case where "finish" is inputted, the flow goes to the end. In a case where nothing is inputted, the flow goes to the step S63 to execute "line inputting". There are some methods to input the command, entering a defined command key from the keyboard 105 and selecting a menu from the display 103 are the examples.

In the step S63, the write pointer q in the coordinates storage memory is substituted for a variable q.

In the step S64, the coordinates data P inputted through the coordinates input device 101 is stored in the coordinates storage memory and write pointer q is incremented.

Figure 7A:
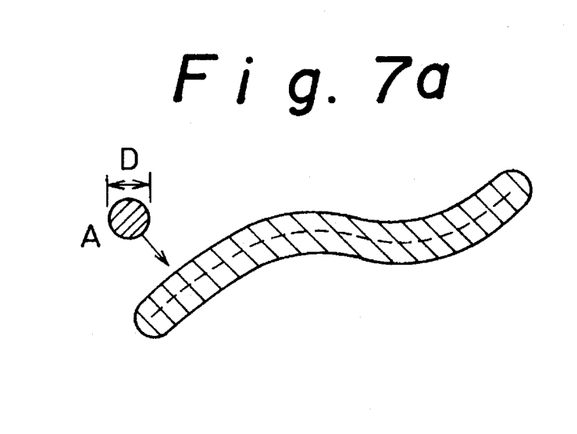
FIG. 7a shows a first figure parts and a first curved line.

In the step S65, a black line having a width corresponding to a diameter D of a circle A is drawn from the last inputted point P to the newly inputted point P' as shown in FIG. 7a.

In the step S66, the judgment of whether the input of coordinates is over or not is done. The judgment is based on the condition of the switch on the coordinates input device 101. That is, in a case where the switch is on, CPU 104 understands that the input of coordinates is still continuing, and in a case where the switch is off, CPU 104 understands the input of coordinates is over.

In a case where the input of coordinates is continuing, the flow returns to the step S64. In a case where the input of coordinates is over, the flow goes to the step S67.

Figure 7B:
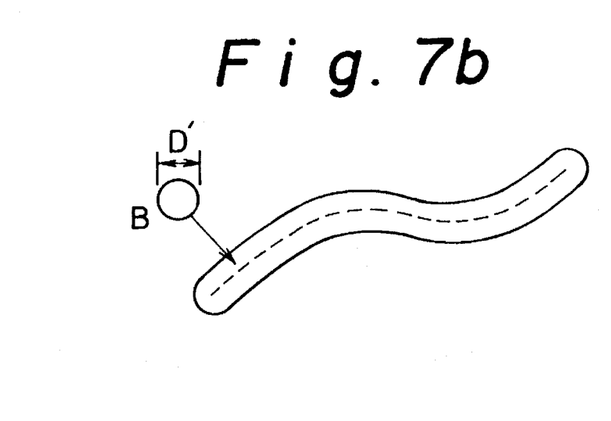
FIG. 7b shows a second figure parts and a second curved line.

In the step S67, a white line having a width corresponding to a diameter of a circle B is drawn from the corresponding point of variable q0 to the corresponding point of write pointer q-1, in other words, coordinates are read out from the coordinates storage memory Q as continuous inputted coordinates as shown in FIG. 7b.

The circle B in the step S67 has a diameter D', which is defined from the diameter D of the circle A in the step S65 so as to exist the following expression.

$$D'=D-d \ (d>0)$$

From this definition, the edge remains as a curved line. The width of the line of "round edge road" is corresponding to half of a difference of the two circles (d/2). FIG. 7b is an example of "round edge road" produced in this manner. A dashed line in FIG. 7b shows two locus of the center of circle A and circle B. The locus of the center of both circle are completely overlapped with each other. After the step S67, the flow returns to the step S62.

Figure 7C:
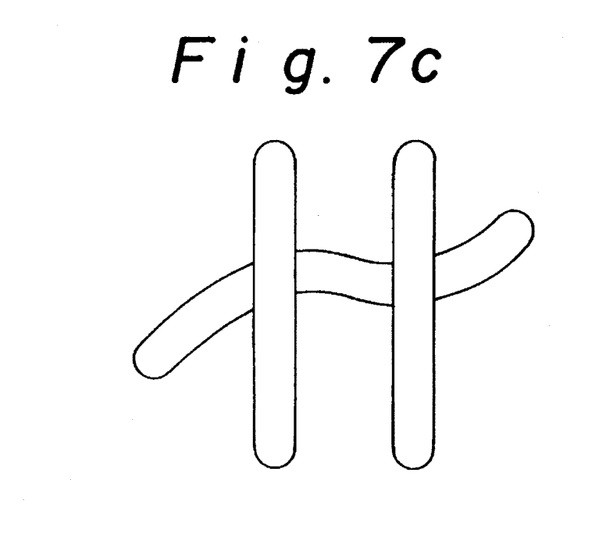
FIG. 7c shows road symbols having cubic crossed portion and FIG. 7d shows erasing steps with second figure parts.
Figure 7D:
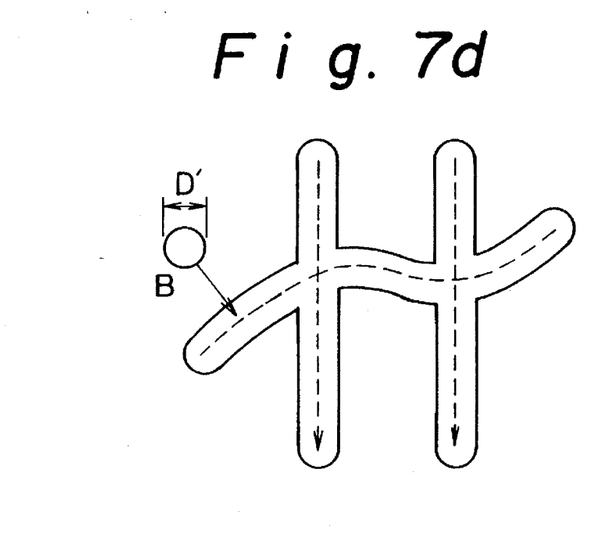

FIG. 7c is an example of three "round edge road" produced in above mentioned manner. As shown in this example, "round edge road" produced later is displayed as an overpass on that produced before.

In a case where road symbol without two level crossing shown in FIG. 16 is drawn, "crossroad erasing" command is selected in the step S62. Then, the flow goes to the step S68.

In the step S68, all the coordinates data stored in the coordinates storage memory Q are read out. Then, white line having the width corresponding to the diameter D' of the circle B is drawn as shown in FIG. 7b. As a result, all "round edge road" produced before the time are redrawn with the circle B. The result of "crossroad erasing" to FIG. 7c is FIG. 7d. The flow goes to the end after the step S68.

The above mentioned embodiment is a method of finishing the program after erasing two level crossings. There is another method of producing "round edge road" after erasing two level crossings. The essence of the present invention is storing the inputted coordinates and drawing with the line having the width corresponding to the circle B along the read out the storing coordinates data.

The combination of colors is not limited to black and white shown in this embodiment.

It is possible to produce a road symbol by drawing a black line having a width with drawing a white line having a width in just delayed.

It is possible to erase two level crossings with regarding to the stored coordinates data while drawing one road symbol.

The style of the figure parts shown in FIG. 7a and FIG. 7b is not limited to a circle in this embodiment. The essence of the present invention is providing two figure parts in the same style and of different sizes, and drawing with smaller figure parts after drawing with larger figure parts.

Road symbol with round extremities is drawn by using a round figure part. Road symbol with extremities of another style is drawn by using figure parts different in style.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image producing apparatus comprising:

coordinates input means for inputting coordinates representative of a curved line;

image storing means for storing a figure part of a predetermined image and the input coordinates representative of the curved line; and drawing means for drawing said image by repeatedly reading out said stored figure part at each interval, corresponding to a width of said stored figure part, along said curved line represented by said coordinates inputted through said coordinates input means.

2. An apparatus according to claim 1, further comprising, coordinates storing means for storing coordinates of a temporary end of said drawn image, in series; and determining means for determining a direction of said drawn image from said stored coordinates in said coordinates storing means and a next coordinates inputted through said coordinates input means.

3. An apparatus according to claim 1, further comprising, coordinates storing means for storing coordinates of a temporary end of said drawn image, in series; and prohibiting means for prohibiting said figure part from being read out upon determining that a distance between said stored coordinates in said coordinates storing means and said inputted coordinates is narrower than a width of said figure part.

4. An apparatus according to claim 1, 2 or 3, wherein said figure part includes a pattern of two line segments intersecting at center points of said line segments.

5. An apparatus according to claim 1, further comprising, circle drawing means for automatically drawing a circle around each connective point of said figure part in said drawn image, wherein said figure part having a width is drawn repeatedly, said circle being of a diameter equal to said width of said figure part.

6. An apparatus according to claim 5, wherein said figure part includes a pattern of a white square between two black squares.

7. An apparatus according to claim 1, 2, 3 or 5, further comprising, input finish judging means for judging completion of input of said image through a condition of an input means, such as a switch.

8. An image producing apparatus comprising:

coordinates input means for inputting coordinates representative of a curved line;

first drawing means for drawing a first curved line on said curved line represented by said coordinates inputted through said coordinates input means, said first curved line having a width corresponding to a first figure part;

second drawing means for drawing a second curved line on said first curved line drawn by said first drawing means, said second curved line having a width corresponding to a second figure part; and producing means for producing parallel curved lines from the first and second curved lines drawn, each of said parallel curved lines having a width equal to half of a difference between said width of said first curved line and said width of said second curved line.

9. An apparatus according to claim 8, further comprising, coordinates storing means for storing coordinates of said parallel curved lines produced by said producing means; and erasing means for erasing a portion of lines appointed by said second drawing means, said appointed portion including an overlapping portion of lines produced by said producing means.

10. An apparatus according to claim 8 or 9, wherein said apparatus is adapted to change a color of said curved line drawn by said first drawing means and to change a color of said curved line drawn by said second drawing means.

11. An apparatus according to claim 8, or 9, wherein said apparatus is adapted to change a width of said first figure part and to change a width of second figure part.

* * * * *